5 Sheets—Sheet 1.

C. LÜHRIG.

PROCESS OF SEPARATING AND CLEANSING COAL AND OTHER MINERALS.

No. 11,334. Reissued May 9, 1893.

Witnesses
Geo. Rance
E. Foster.

Inventor
Carl Lührig.
By Wm. F. Parker
Attorney

5 Sheets—Sheet 2.

C. LÜHRIG.

PROCESS OF SEPARATING AND CLEANSING COAL AND OTHER MINERALS.

No. 11,334. Reissued May 9, 1893.

Witnesses
Geo. Severance
E. Foster

Inventor
Carl Lührig.
By Henry F. Parker.
Attorney

5 Sheets—Sheet 3.

C. LÜHRIG.

PROCESS OF SEPARATING AND CLEANSING COAL AND OTHER MINERALS.

No. 11,334. Reissued May 9, 1893.

Witnesses
S. Severance.
E. Foster

Inventor
Carl Lührig.
By Henry F. Harper.
Attorney

5 Sheets—Sheet 4.

C. LÜHRIG.

PROCESS OF SEPARATING AND CLEANSING COAL AND OTHER MINERALS.

No. 11,334. Reissued May 9, 1893.

Witnesses
Severance.
E. Foster.

Inventor
Carl Lührig.
By Henry F. Parker.
Attorney

5 Sheets—Sheet 5.

C. LÜHRIG.

PROCESS OF SEPARATING AND CLEANSING COAL AND OTHER MINERALS.

No. 11,334. Reissued May 9, 1893.

Witnesses
Severance.
E. Foster.

Inventor
Carl Lührig.
Henry F. Parker.
Attorney

UNITED STATES PATENT OFFICE.

CARL LÜHRIG, OF DRESDEN, GERMANY, ASSIGNOR, BY MESNE ASSIGNMENTS, TO THE LÜHRIG COAL WASHING COMPANY, OF WEST VIRGINIA.

PROCESS OF SEPARATING AND CLEANING COAL AND OTHER MINERALS.

SPECIFICATION forming part of Reissued Letters Patent No. 11,334, dated May 9, 1893.

Original No. 474,022, dated May 3, 1892. Application for reissue filed December 29, 1892. Serial No. 456,711. Patented in Germany June 12, 1885, No. 34,944, and in England June 18, 1885, No. 7,399, and April 28, 1888, No. 6,341.

*To all whom it may concern:*

Be it known that I, CARL LÜHRIG, a subject of the Emperor of Germany, residing at Dresden, Saxony, German Empire, have invented a new and useful Process of Separating and Cleansing Coal and other Minerals, (for which Letters Patent were granted to me in England, dated April 28, 1888, No. 6,341, and June 18, 1885, No. 7,399, and in Germany, dated June 12, 1885, No. 34,944,) of which the following is a specification.

This invention relates to novel means and apparatus by which a succession of operations can be automatically carried on for the purpose of screening and washing coal and other minerals, and ridding it of foreign matter, or shale, slates, and other incombustible substances, and to automatically obtain coal or other products of different sizes, as fine coal, coarse coal or nuts, a "middle product" or an intermediate kind of coal, pyrites, with which some classes of coal are often permeated, and the sludge or "schlamm" produced by washing. In connection with the appliances is a collector for sediment and flocculent matter contained in or taken up by the water, so that the water is collected in a clear state and returned to a reservoir for reuse.

The invention will be understood by reference to the annexed drawings.

Figure 1:
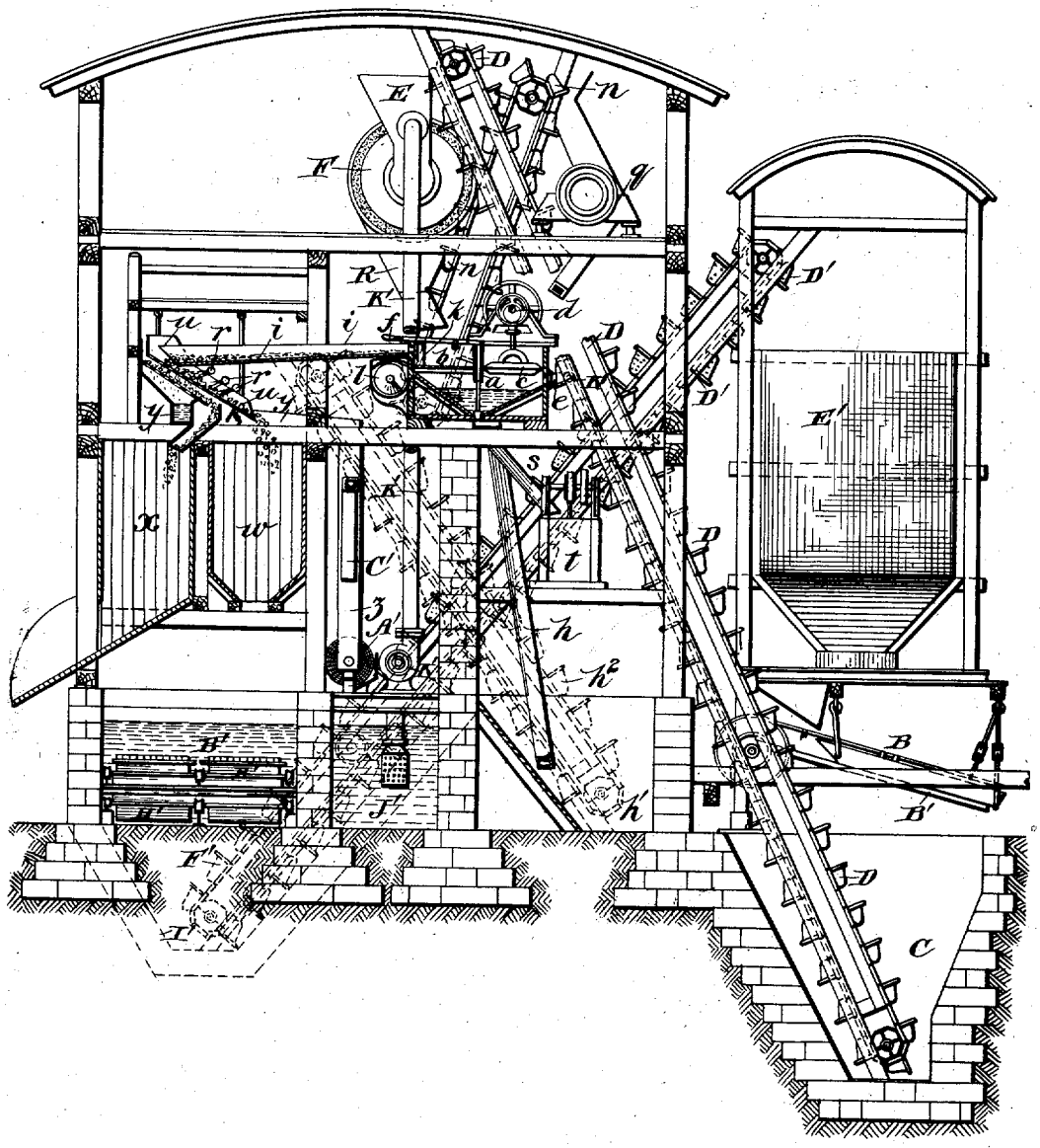
Figure 2:
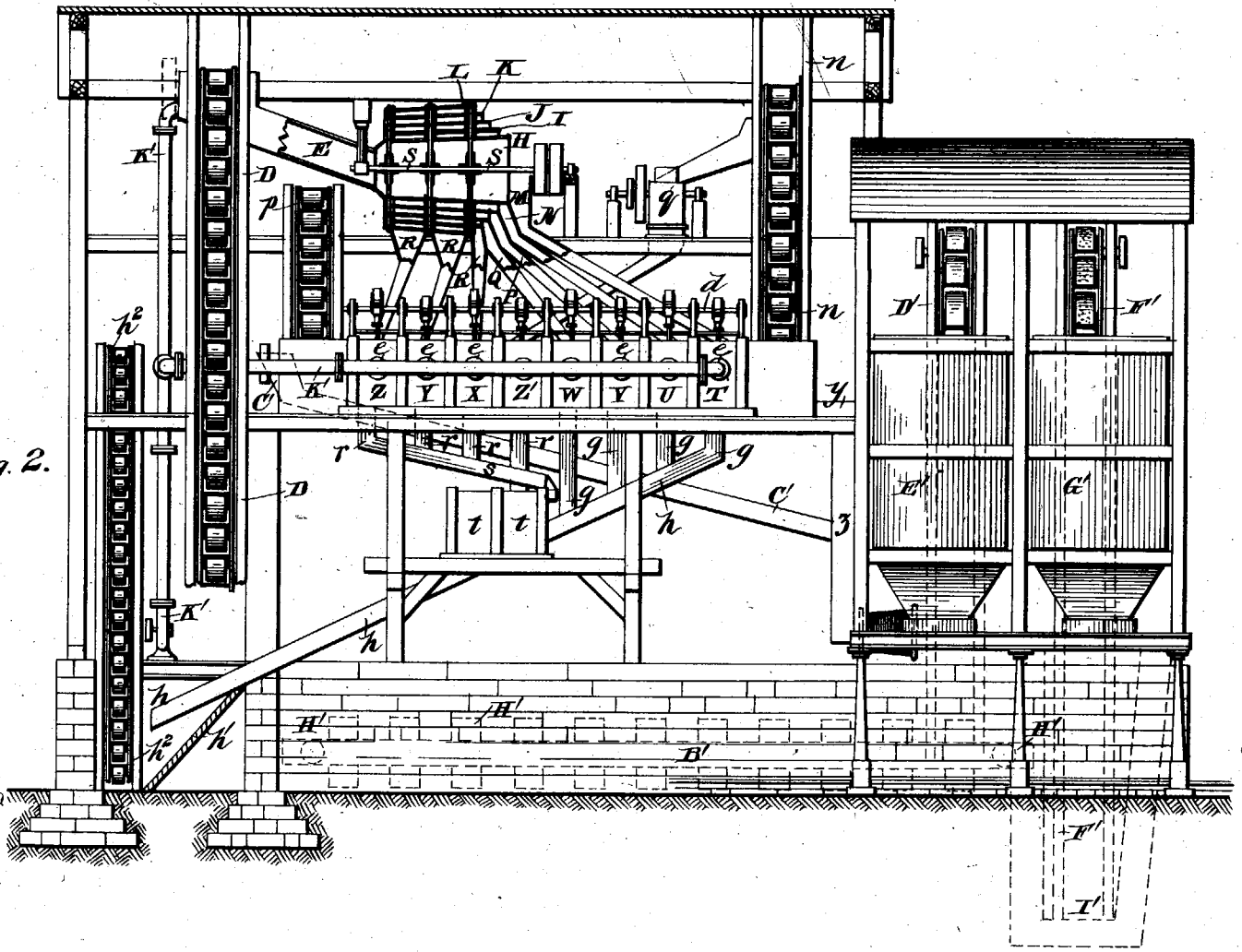
Figure 3:
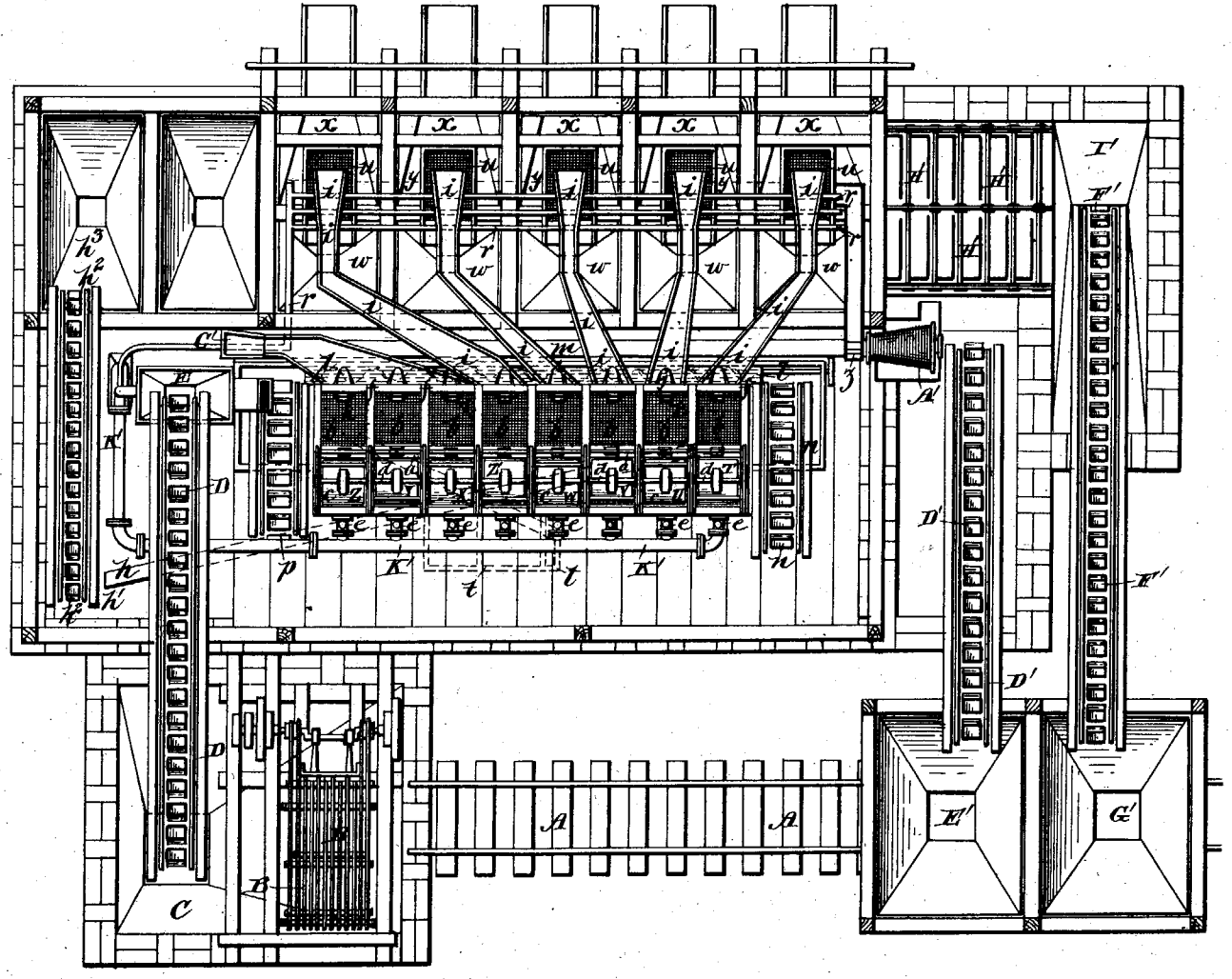
Figure 4:
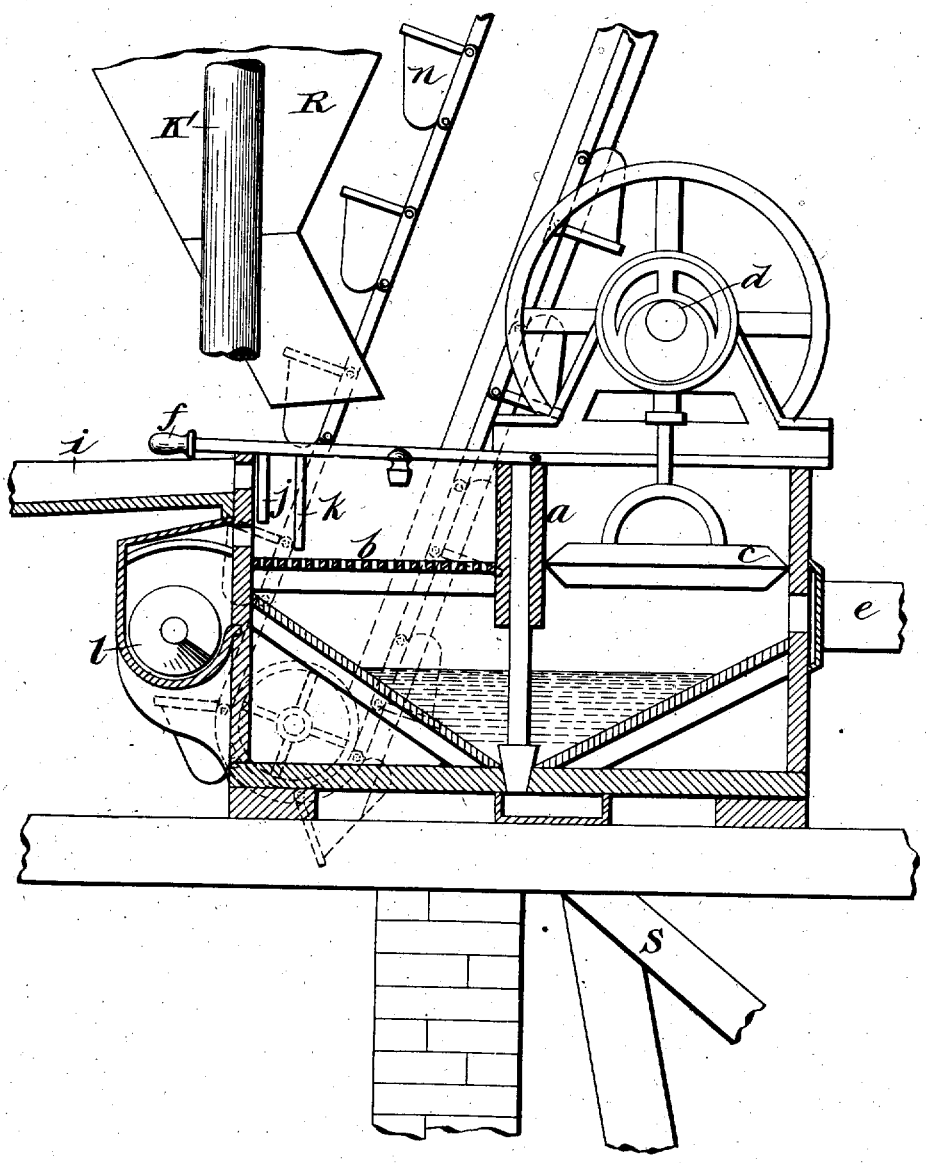
Figure 5:
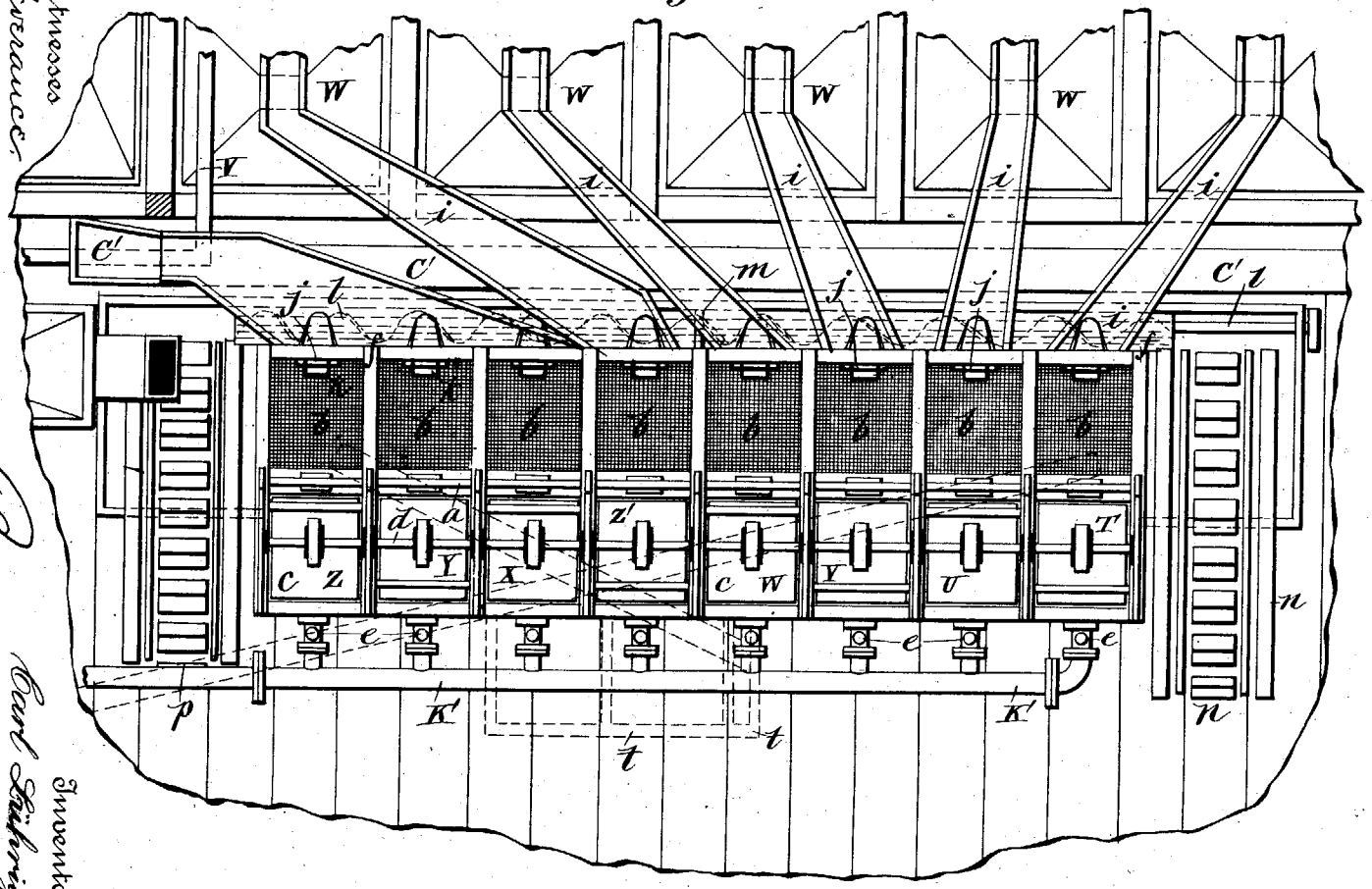

Figure 1, is an end elevation, partly in section, of a structure in which the several features of the invention are indicated. Fig. 2, is a side elevation; Fig. 3, a plan. Fig. 4, is a view, partly in elevation and partly in section, showing certain details of construction hereinafter described. Fig. 5, is a plan showing, upon an enlarged scale, certain details of the apparatus.

The coal or mineral in trucks, trolleys, or corves, preferably on a line of metals A, is shot therefrom to and upon suspended gratings or vibrating bars or shaking screens B and B′, through which the pieces to be operated on are passed, the larger pieces passing off from the ends into trucks and being used as lump coal. The screened material then falls into a pit C, from which, by means of the endless chain of buckets or elevator D, it is carried to the upper part of the building, where it falls into a chute E, and from there into the revolving screen or drum F. This screen is composed of, say, five concentric drums H I J K L, one within the other and with meshes of different degrees of fineness, the innermost drum having the largest meshes, so that the largest particles will pass from the central drum H into a chute M, the next size from the drum I into the chute N, that from J into the chute P, from K into chute Q, and that which is of a very fine character from L into the chutes R R R. The drum just referred to is of tapered form and is carried by one shaft S, to which rotary motion can be communicated in any known manner. The concentric drums or screens are held at their respective distances apart by radial bolts connected to the shaft, tubular distancing pieces and nuts holding them in position. The concentric screens of this drum are of different lengths. Consequently the spouts arranged under their outlets can respectively receive the coarse and fine screened material. From the chutes or spouts M N P Q the coarser grades of coal fall into jiggers or washers T U V W, respectively. The fine particles from the spouts R R R fall, respectively, into the three jiggers or washers X Y Z. All these jiggers or washers have a partition *a*, and the coal falls upon perforated floors or sieves *b*, arranged on one side of the partition *a*. The other sides of the jiggers or washers have plungers or pistons *c*, as clearly indicated in Figs. 1 and 4, the plungers or pistons *c* being worked up and down by eccentrics on the shaft *d*, and the water for washing is supplied through a cock or pipe *e*. The lower part of the jiggers or washers is of tapered form and receives the sludge washed from the coal, the water being forced up and down through the perforated floors or sieves *b* by the up-and-down motion of the plunger or piston *c*. The bottom of each receiver has a hole stopped by a conical plug, which is lifted from time to time by the handle *f*, so that when the fine sludge or "clean dirt" has to be removed it passes down their respective outlet-spouts *g g g g* into a spout *h*, common to all of them for discharging the clean dirt into a pit *h′*, from which it can be removed by the elevator $h^2$ to hopper $h^3$, for discharge into trucks. The washed coal passes from perforated floors or sieves $b$, through the upper of the two openings in the jigger or washer, as shown on the drawings, into the chute $i$. An adjusting slide $j$, behind which is a fenced plate $k$, reaches almost down to the sieve, so that the heavy material or slate shall pass under the plate on its way to the lower opening to the worm or conveyer $l$.

The trough of the conveyer or worm is divided by a plate $m$, Fig. 5, and the worm—part of which is right-threaded, the other part left-threaded, Fig. 5—takes the shale, slate, and intergrown coal from the washers or jiggers T U V W to the elevators $n$, which deliver the stuff through a spout to the crusher $q$, by which the intergrown coal is opened up by the crusher. The crushed coal then falls through a spout to jigger or washer Z′ and is treated in exactly the same manner as that of the other jiggers, but giving an intermediate kind of coal and that from the washers or jiggers X Y Z to elevator $p$. The fine heavy dirt from jiggers X Y Z Z′, should it contain pyrites, requires a distinct washing to extract the pyrites therefrom, and this is effected in the washer or jigger $t$, to which it is led through spouts $r$ $r$ $r$ $r$ and $s$, which jigger is provided with a piston or plunger in a similar manner to the jiggers or washers before mentioned. The clean-washed coal passes from the chutes $i$ before mentioned, to suspended shaking drainers $u$, to which another supply of water is furnished by jets $v$ $v$ for brightening the coal, the larger pieces of coal falling into the hopper $w$ and the finer into the hopper $x$, said hoppers being provided with gates which when opened allow of the coal to be shot into different trucks or trolleys. The water from $i$ and $v$ passes along with fine sludge through the lower drainer into a receptacle $y$, from which they flow into $z$, and through the drum A′ into sludge or schlamm pit B′. The fine washed coal from the jiggers or washers X Y Z also passes into a drum A′ by the spout C′. This drum A′ is composed of very fine mesh, so that the fine sludge passes through it into the sludge-channel B′. The particles of coal, passing out from the drum A′, fall into a receptacle from which they are lifted by an endless chain of buckets or elevators D′ and discharged into a hopper E′. The sludge-pit I′ is comparatively deep, for the subsidence of the rough solids contained in it, which solids can be removed by the endless chain of perforated draining-buckets or elevator F′ into a hopper G′. This elevator works slowly, so as not to create much agitation on the surface of the water, the level of which is maintained to a given height. In connection with the upper part of this pit I′ is the long channel B′, in which an endless chain of boxes H′ moves. The boxes form attraction-plates for flocculent matter held in suspension in the water to adhere to them, and as the boxes reverse their positions and move along the bottom of the channel they scrape the light particles that have settled on the bottom into the sludge pit I′, the clarified water passing off by a channel into the well J′, from which the centrifugal pump K′ derives its supply, to be used again. The centrifugal pump also furnishes water to the drum F, the washers T U V W X Y Z Z′, and the pipes $v$ $v$.

The plates H′ may operate as attraction plates and scrapers combined, or as scrapers solely; and the same are caused to move gradually so as to allow the flocculent matter to settle to the bottom of the channel B′.

Having now particularly described and ascertained the nature of my said invention and in what manner the same is to be performed, I declare that what I claim is—

1. The process of treating mined or broken coal or other minerals in compound native combination, consisting first, in mechanically separating the particles according to size; second, hydraulically separating the particles according to specific gravity; and third, separately crushing a grade of those particles having a distinctive specific gravity, and again hydraulically separating the constituents of said grade according to specific gravity.

2. The process of treating mined or broken coal or other minerals in compound native combination, consisting in first, mechanically separating the particles according to size; second, hydraulically separating the particles according to specific gravity; and third, crushing the larger of the heavier particles or middle product thus separated, and again hydraulically separating the constituents thereof according to specific gravity.

3. The hereinbefore-described process of treating mined or broken coal containing more or less foreign matter in mechanical mixture, consisting in subjecting the mass of such material to a rotary screening action, and thus centrifugally separating the mass into particles of different sizes and discharging them into separate compartments, where the particles are washed and further separated, the lighter from the heavier, then crushing the larger of these heavier particles, and separating therefrom any remaining lighter material that may have remained intergrown or in natural combination therewith by washing the crushed mass and recovering said lighter material from the water used, as fine coal or sludge matter, substantially as and for the purposes set forth.

4. In a machine for separating and washing broken coal, the combination of the following-named instrumentalities, all operating and coacting substantially as described namely: a centrifugal or rotary screen, as F, jiggers or washer-compartments for receiving the coal screened through said screen, a conveyer or elevator for removing the heavier material from the jiggers, a crusher for crushing said heavier material, and a jigger or washer-compartment for washing the crushed material, whereby different sizes of coal are sorted from the mass, separately washed and recovered, and smaller coal separated by crushing from said heavier material, washed, and recovered, leaving as a residuum sludge or sedimentary material, substantially as and for the purposes set forth.

5. In a machine for separating and washing coal, the combination of a sediment collector, a water-clarifier, and a screen drum of finely-graduated meshes, whereby the sludge or residuary sedimentary material is recovered and sorted into different-sized particles, substantially as and for the purposes set forth.

6. In a machine for separating and washing coal, the combination of a sludge channel, an endless series of traveling scrapers within the channel, all the scrapers of the series being wholly submerged and means for removing the separated sediment and clarified water, substantially as described.

In witness whereof I have hereto signed my name, in the presence of two subscribing witnesses, this 1st day of September, 1892.

CARL LÜHRIG.

Witnesses:
ROBT. M. HOOPER,
W. M. KIRKHAM.